(12) United States Patent
Wigren et al.

(10) Patent No.: US 12,647,902 B2
(45) Date of Patent: Jun. 2, 2026

(54) CONTROLLING TOTAL AVERAGE TRANSMISSION POWER OF A RADIO BASE STATION

(71) Applicant: Telefonaktiebolaget LM Ericsson (publ), Stockholm (SE)

(72) Inventors: Torbjörn Wigren, Uppsala (SE); Diana Yamalova, Knivsta (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 352 days.

(21) Appl. No.: 18/571,208

(22) PCT Filed: Jun. 23, 2021

(86) PCT No.: PCT/SE2021/050618
§ 371 (c)(1),
(2) Date: Dec. 15, 2023

(87) PCT Pub. No.: WO2022/271056
PCT Pub. Date: Dec. 29, 2022

(65) Prior Publication Data
US 2024/0314700 A1    Sep. 19, 2024

(51) Int. Cl.
*H04W 52/22* (2009.01)
*H04W 52/36* (2009.01)

(52) U.S. Cl.
CPC ....... *H04W 52/225* (2013.01); *H04W 52/223* (2013.01); *H04W 52/367* (2013.01)

(58) Field of Classification Search
CPC ............. H04W 52/225; H04W 52/223; H04W 52/367; H04W 52/143; H04W 52/08;
(Continued)

(56) References Cited

U.S. PATENT DOCUMENTS

| | | | | |
|---|---|---|---|---|
| 11,064,443 B1 * | 7/2021 | Lin | ..................... | H04W 52/225 |
| 2004/0058685 A1 * | 3/2004 | Raitola | ............... | H04W 52/267 |
| | | | | 455/450 |

(Continued)

FOREIGN PATENT DOCUMENTS

| | | | |
|---|---|---|---|
| KR | 20210010199 A | 1/2021 |
| WO | 2020197455 A1 | 10/2020 |

(Continued)

OTHER PUBLICATIONS

International Search Report and Written Opinion, Application No. PCT/SE2021/050618, Mar. 9, 2022, 15 pages.
(Continued)

*Primary Examiner* — Andrew Wendell
(74) *Attorney, Agent, or Firm* — Nicholson De Vos Webster & Elliott LLP

(57) ABSTRACT

A method performed by a control device for controlling total average transmission power of a radio base station. The method comprises performing, for a current discrete time value, control of total average transmission power according to an average power control loop and subject to an upper threshold value. The total average transmission power is computed over an averaging time window T of a present value of momentary transmission power and N−1 preceding values. This is controlled to not exceed the threshold value by a resource threshold factor that limits the momentary transmission power and by for at least one future discrete time value less than, or equal to, t+T predicting a future value of the total average transmission power for a future assumed resource threshold factor. The method comprises gradually changing this factor as a function of a present state of the control loop.

20 Claims, 11 Drawing Sheets

(58) Field of Classification Search
CPC .. H04W 52/04; H04W 52/0232; H04W 52/36
See application file for complete search history.

(56)                    References Cited

U.S. PATENT DOCUMENTS

| | | | |
|---|---|---|---|
| 2004/0236559 A1* | 11/2004 | Chen | G06F 30/33 |
| | | | 703/18 |
| 2008/0014978 A1* | 1/2008 | Kaneko | H04L 27/0012 |
| | | | 455/522 |
| 2013/0301428 A1* | 11/2013 | Weng | H04W 52/52 |
| | | | 370/252 |
| 2016/0087815 A1* | 3/2016 | Balachandran | H04B 1/10 |
| | | | 375/346 |
| 2017/0064641 A1 | 3/2017 | Logan et al. | |
| 2019/0387377 A1* | 12/2019 | Zhang | H04W 52/383 |

FOREIGN PATENT DOCUMENTS

| | | |
|---|---|---|
| WO | 2020239214 A1 | 12/2020 |
| WO | 2021069953 A1 | 4/2021 |

OTHER PUBLICATIONS

Christer Törnevik et al., "Time Averaged Power Control of a 4G or a 5G Radio Base Station for RF EMF Compliance," 2020, 14 pages, vol. 8, IEEE Access.

* cited by examiner

RF EMF average
power threshold

Time

CONTROLLING TOTAL AVERAGE TRANSMISSION POWER OF A RADIO BASE STATION

CROSS-REFERENCE TO RELATED APPLICATIONS

This application is a National stage of International Application No. PCT/SE2021/050618, filed Jun. 23, 2021, which is hereby incorporated by reference.

TECHNICAL FIELD

Embodiments presented herein relate to a method, a control device, a computer program, and a computer program product for controlling total average transmission power of a radio base station.

BACKGROUND

When any radio equipment is to be deployed, regulatory radio frequency (RF) electromagnetic field (EMF) exposure requirements should be accounted for. These RF EMF exposure regulations may typically be based on the guidelines from the International Commission on Non-Ionizing Radiation Protection (ICNIRP) but may take different forms in some countries and regions. The aim of RF EMF exposure regulations is to ensure that human exposure to RF energy is kept within prescribed limits, which typically have been set with wide safety margins.

Some newly developed base stations and other radio equipment are equipped with so-called advanced antenna systems (AAS). These antenna systems increase the capacity and/or coverage compared to traditionally used antenna system by addition of one or more antenna arrays. In turn, this enables the simultaneous transmission of parallel data streams between a base station on the network side and a terminal device at the user-side by means of so-called multiple-input-multiple-output (MIMO) transmission.

For base stations and other radio equipment having AAS with a large number of antenna elements in order to achieve a high directivity, there may be a large maximum beamforming gain. A consequence of a large beamforming gain is typically that the radiated power is concentrated in directional beams, meaning that the Equivalent Isotropic Radiated Power (EIRP) rating of the base station, i.e. the power radiated from an antenna with unity antenna gain in all directions, is increased as compared to the situation without AAS.

The RF EMF exposure limitations are typically expressed in terms of the power density (in units of W/m$^2$) which in the far field is proportional to the EIRP. Consequently, the EIRP can be used to determine the power density in the far field.

The ICNIRP and other RF EMF exposure limitations are usually expressed in terms of average power density over a specified averaging time interval T. This means that the momentary power density can be higher during a shorter time than T, however the time-averaged power density over any time period of duration T must be below the specified limit. To maintain a certain RF EMF compliance boundary or exclusion zone, that is smaller than what is obtained using the maximum EIRP of the AAS, the time-averaged total transmit power then needs to be controlled to be less than an average power threshold that is computed based on the RF exposure limitations and the selected exclusion zone. In cases where more than one power source share the same AAS or where several AASs are co-sited and aligned, the threshold may have to be computed in terms of the combined transmitted power or EIRP of the site.

Hence, there may be a need for efficient control of the average power or EIRP for base stations and other radio equipment.

SUMMARY

An object of embodiments herein is to provide efficient control of radio power sources of base stations and other radio equipment, so that certain RF EMF exclusion zones are maintained by the controlled time-averaged powers of the base stations and radio equipment.

This objective is generally solved by a method performed by a control device for controlling total average transmission power of a radio base station, and a control device configured to perform such a method.

According to a first aspect there is presented a method for controlling total average transmission power of a radio base station. The method is performed by a control device. The method comprises performing, for a current discrete time value t, control of total average transmission power $\langle P_{tot}\rangle$ (t) of the radio base station according to an average power control loop and subject to an upper average power threshold value that is based on a computed exclusion zone. The total average transmission power $\langle P_{tot}\rangle$ (t) is computed over an averaging time window T of a present value of momentary transmission power and N−1 values of momentary transmission power preceding the present value of momentary transmission power. The total average transmission power in the average power control loop is controlled to not exceed the upper average power threshold value by a resource threshold factor that limits the momentary transmission power and by for at least one future discrete time value less than, or equal to, t+T predicting a future value of the total average transmission power for a future assumed resource threshold factor. The method comprises gradually changing the resource threshold factor as a function of a present state of the average power control loop. The present state at least pertains to the total average transmission power.

According to a second aspect there is presented a control device for controlling total average transmission power of a radio base station. The control device comprises processing circuitry. The processing circuitry is configured to cause the control device to perform, for a current discrete time value t, control of total average transmission power $\langle P_{tot}\rangle$ (t) of the radio base station according to an average power control loop and subject to an upper average power threshold value that is based on a computed exclusion zone. The total average transmission power $\langle P_{tot}\rangle$ (t) is computed over an averaging time window T of a present value of momentary transmission power and N−1 values of momentary transmission power preceding the present value of momentary transmission power. The total average transmission power in the average power control loop is controlled to not exceed the upper average power threshold value by a resource threshold factor that limits the momentary transmission power and by for at least one future discrete time value less than, or equal to, t+T predicting a future value of the total average transmission power for a future assumed resource threshold factor. The processing circuitry is configured to cause the control device to gradually change the resource threshold factor as a function of a present state of the average power control loop. The present state at least pertains to the total average transmission power.

According to a third aspect there is presented a control device for controlling total average transmission power of a radio base station. The control device comprises a control module configured to perform, for a current discrete time value t, control of total average transmission power $\langle P_{tot} \rangle$ (t) of the radio base station according to an average power control loop and subject to an upper average power threshold value that is based on a computed exclusion zone. The total average transmission power $\langle P_{tot} \rangle$ (t) is computed over an averaging time window T of a present value of momentary transmission power and N−1 values of momentary transmission power preceding the present value of momentary transmission power. The total average transmission power in the average power control loop is controlled to not exceed the upper average power threshold value by a resource threshold factor that limits the momentary transmission power and by for at least one future discrete time value less than, or equal to, t+T predicting a future value of the total average transmission power for a future assumed resource threshold factor. The control device comprises a change module configured to gradually change the resource threshold factor as a function of a present state of the average power control loop. The present state at least pertains to the total average transmission power.

According to a fourth aspect there is presented a computer program for controlling total average transmission power of a radio base station, the computer program comprising computer program code which, when run on a control device, causes the control device to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

Advantageously this method, these control devices, this computer program and this computer program product enable efficient control of the total average transmission power of the radio base station.

Advantageously this method, these control devices, this computer program and this computer program product enable the total average transmission power to always be below the average power threshold set by operators for a selected exclusion zone.

Advantageously this method, these control devices, this computer program and this computer program product require only a comparatively low computational complexity for controlling the total average transmission power of the radio base station.

Advantageously this method, these control devices, this computer program and this computer program product does not result in any switching between a maximum throughput value and a minimum throughput value.

Advantageously this method, these control devices, this computer program and this computer program product are based on using one single average power control loop for accounting for all design constraints.

Advantageously this method, these control devices, this computer program and this computer program product require low computational complexity.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a\an\the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
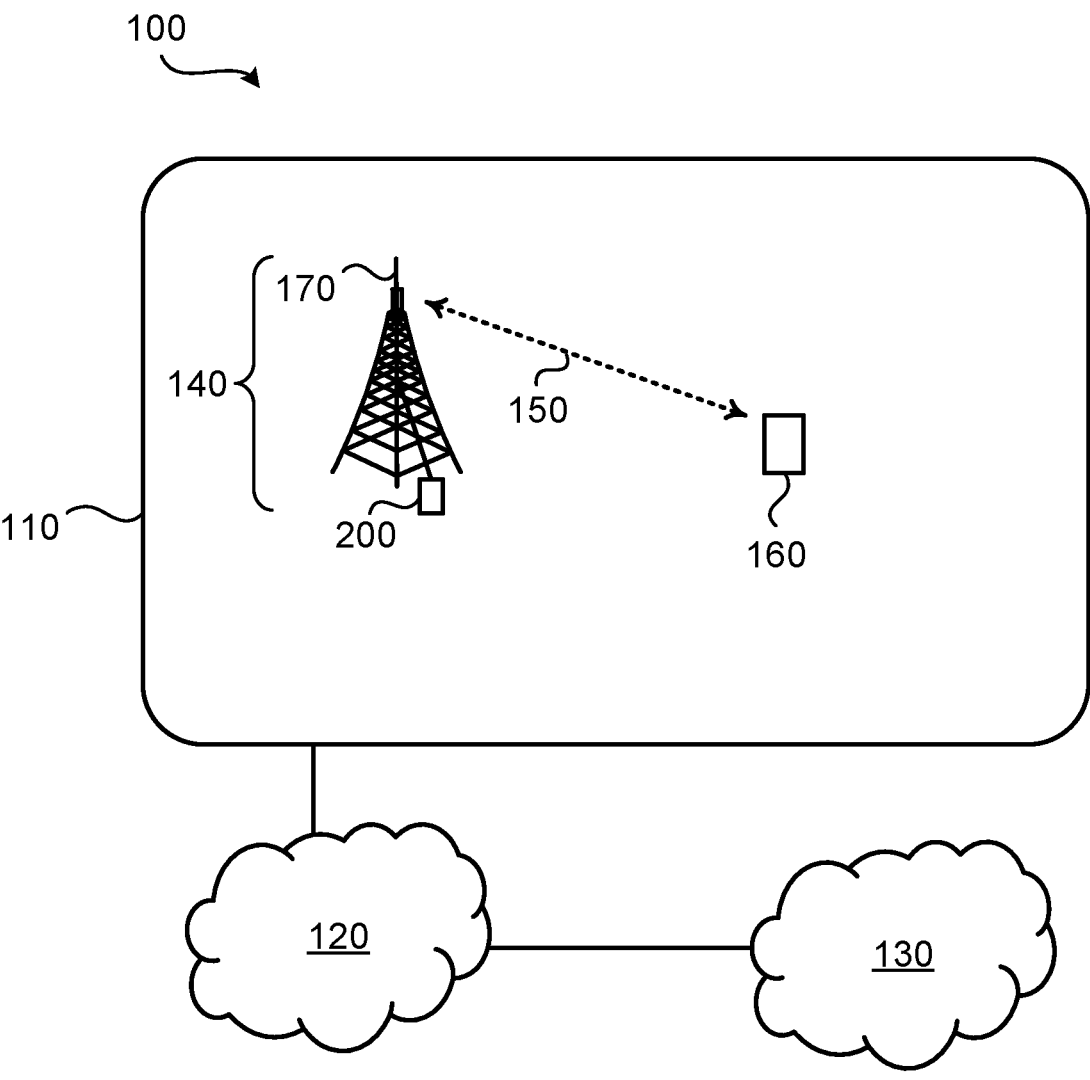
FIG. 1 is a schematic diagram illustrating a communications network according to embodiments.

FIG. 1 is a schematic diagram illustrating a communications network 100 where embodiments presented herein can be applied. The communications network 100 could be a third generation (3G) telecommunications network, a fourth generation (4G) telecommunications network, or a fifth (5G) telecommunications network and support any 3GPP telecommunications standard, where applicable. The communications network 100 comprises a control device 200 configured to control a radio base station 140 that, via a transmission and reception point (TRP) 170 comprising an antenna array, provides network access to at least one terminal device 160 in a radio access network 110, thus enabling the terminal device 160 to communicate over a wireless link 150. The radio access network 110 is operatively connected to a core network 120. The core network 120 is in turn operatively connected to a service network 130, such as the Internet. The terminal device 160 is thereby enabled to, via the radio base station 140, access services of, and exchange data with, the service network 130.

Examples of radio base stations 140 are radio access network nodes, base transceiver stations, Node Bs, evolved Node Bs, gNBs, access points, and access nodes, and backhaul nodes. Examples of terminal devices 160 are wireless devices, mobile stations, mobile phones, handsets, wireless local loop phones, user equipment (UE), smartphones, laptop computers, tablet computers, network equipped sensors, network equipped vehicles, and so-called Internet of Things devices.

The control device 200 might comprise, be collocated with, integrated with, or be in operational communications with, the radio base station 140.

Figure 2:
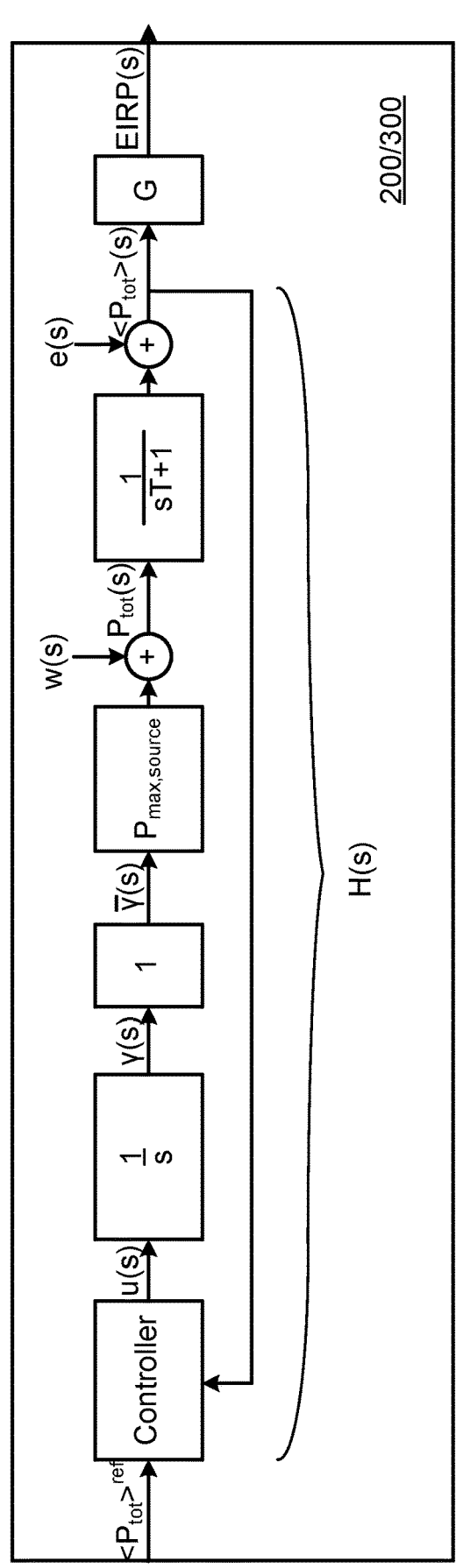
FIG. 2 is a block diagram of a control device according to an embodiment.

FIG. 2 is a block diagram of the control device 200 where feedback control has been enabled by a feedback control loop, in this disclosure denoted an average power control loop. In FIG. 2, $\langle P_{tot} \rangle^{ref}$ denotes the setpoint for the averaged power (typically slightly less than the computed threshold value for the averaged power, which shall not be exceeded), 1/s denotes the actuator dynamics with lower and upper limits inactive, $\bar{\gamma}(t)$ denotes the scheduler limitation after lower and upper limitation (inactive in FIG. 2), and $P_{max}$ denotes the maximal momentary total power of the radio transmitter of the radio base station 140. Further, w(s) denotes a disturbance representing predicted power errors, 1/(sT+1) represents an autoregressive simplified model of the averaging, $\langle P_{tot} \rangle$ (s) denotes the averaged total power, and e(s) denotes a measurement disturbance. All quantities are in FIG. 2 expressed in the Laplace transform domain, which is allowed since the feedback control mechanism design is performed with constraints inactive. Neither w(s) nor e(s) are a part of the herein disclosed inventive concept, but are only shown to provide a model for controller design.

In some aspects the controller block is given by:

$$u(s) = CR(1 + T_D s)(\langle P_{tot} \rangle^{ref} - \langle P_{tot} \rangle(s)).$$

Here, u(s) is the control signal. A controller implementing this controller block is of proportional-derivative (PD) type. C denotes the proportional gain, and $T_D$ the differentiation time.

The poles of the closed loop system of FIG. 2 are given by the following second order equation:

$$s^2 + (1/T + P_{max,site} C T_D)s + P_{max,site} C = 0.$$

These poles govern the closed loop dynamics of the feedback control mechanism, the actuator mechanism, and the averaged power. In order to determine the proportional gain and the differentiation time, a closed loop polynomial with desired poles in $-\alpha_1$ and $-\alpha_2$ is specified as:

$$s^2 + (\alpha_1 + \alpha_2)s + \alpha_1 \alpha_2 = 0.$$

6

An identification of coefficients and solution of the resulting system of equations reveal that the proportional gain and differentiation time shall be selected as:

$$C = \frac{\alpha_1 \alpha_2}{P_*},$$

and $$T_D = \frac{\alpha_1 + \alpha_2 - \frac{1}{T}}{\alpha_1 \alpha_2}.$$

A reason for this choice is that a system with two negative real poles can be expected to be well damped, which is a result of a significant differentiation action.

To implement the feedback control mechanism, $\langle P_{tot} \rangle^{ref}$, $\langle P_{tot} \rangle$ (t) and $\langle P'_{tot}{}^{\cdot} \rangle$ (t) are needed. The first two quantities can be obtained by configuration and averaging of values of measured momentary powers, while the second quantity needs to be estimated. This can e.g. be achieved by autoregressive filtering of $\langle P_{tot} \rangle$ (t) with the filter:

$$\langle P'_{tot} \rangle(s) = \frac{\alpha s}{s + \alpha} \langle P_{tot} \rangle(s),$$

where $\alpha$ is a filter parameter.

In order to further emphasize the average control performance it could be advisable to only allow differential control action that reduces the scheduler threshold $\gamma(t)$, meaning that only negative contributions from the second term of the feedback mechanism should be allowed. This means that in the time domain, the following restriction to the derivative $\langle P'_{tot}{}^{\cdot} \rangle$ (t) might be applied:

$$u(t) = CTe(t) - CTT_D \max(0, \dot{e}(t)).$$

Figure 3:
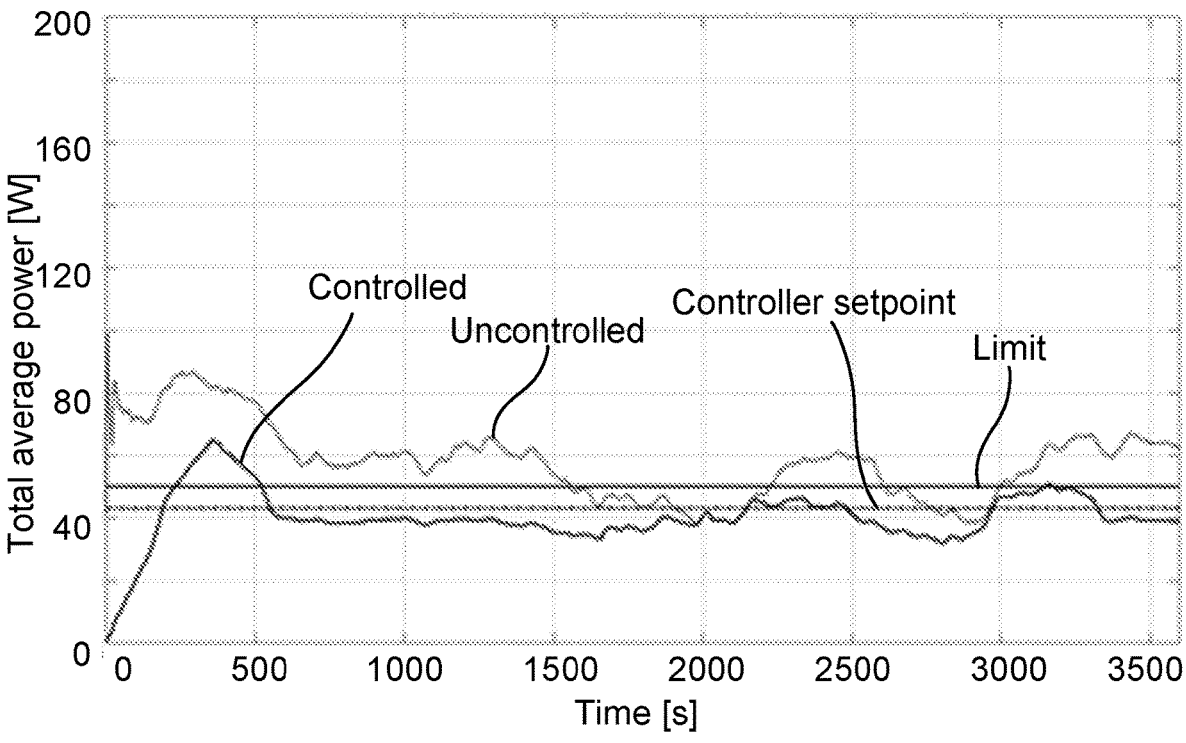
FIG. 3 shows simulation results according to embodiments.

In some scenarios there might be a need to guarantee algorithmically that the regulated time-averaged power is always below the power threshold computed based on the designed RF EMF exclusion zone of the site. The functionality described above does not necessarily have this property. This is because linear control, such as PD control, is not designed to provide such guarantees. They only fallback to use a fraction $\gamma_{tow}$, of the maximum momentary transmission power in case the regulated average power gets very close to the threshold that is not to be exceeded. As shown in FIG. 3, there may still be overshoots. FIG. 3 shows an example of controlling total average transmission power of the radio base station 140 according to the average power control loop of FIG. 2. One reason for this effect is that when the averaging window for some reason is first filled with very low values of momentary transmission power, followed by values of very high momentary transmission power for say 1.5 minutes, the total average transmission power reaches a level close to the threshold. During the remaining averaging time up to T there are nonzero values of momentary transmission power entering the averaging window, due e.g. to transmission of control signalling, that leads to an increased total average transmission power, since the very low values of momentary transmission power in the averaging window initially are shifted out. Hence an overshoot cannot be prevented. This is admittedly a rare situation—however since it can occur, at least theoretically, it can be expected to be a regulator and operator non-negotiable requirement to implement algorithms that prevents this behavior with a 100% guarantee.

Figure 4:
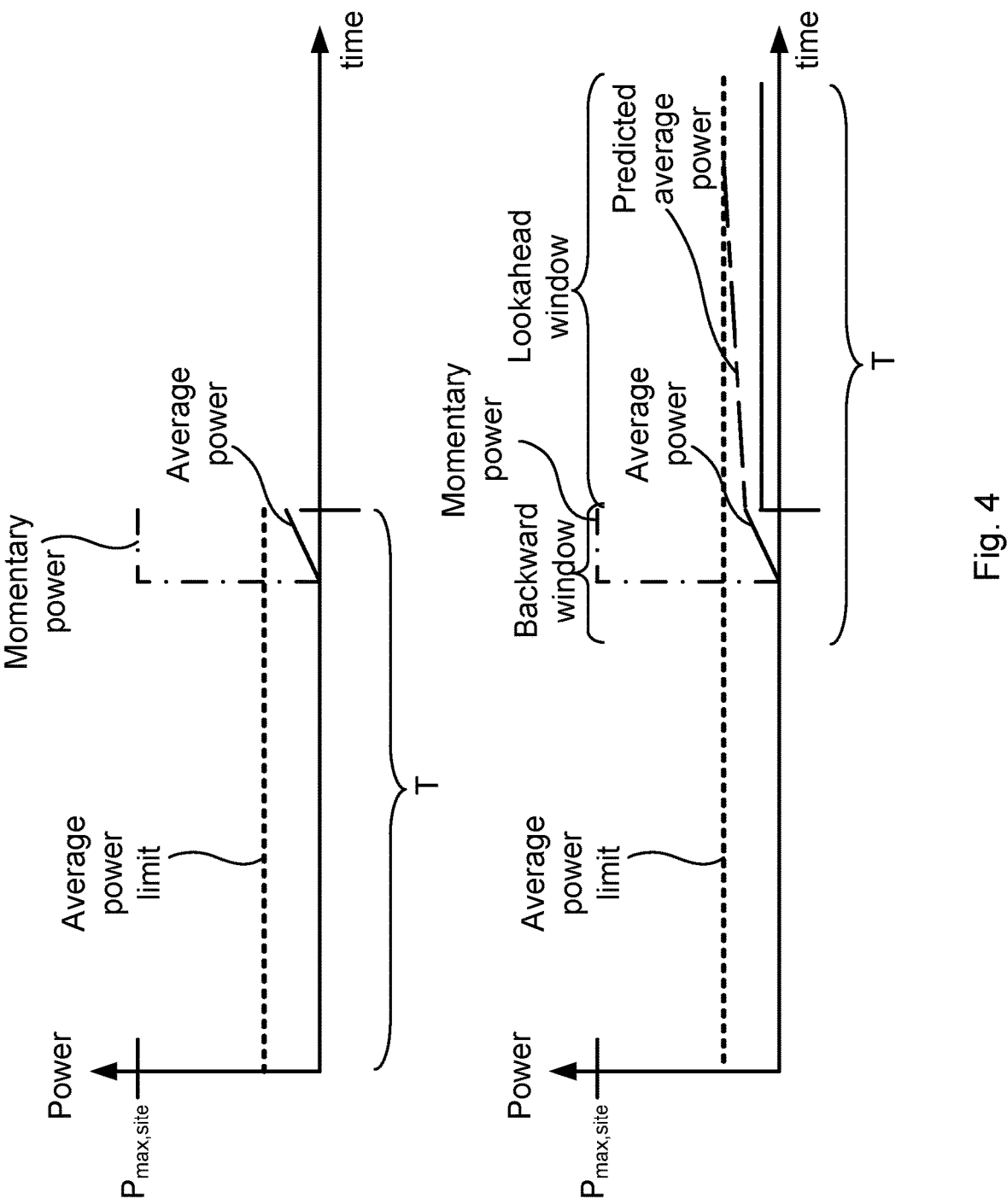
FIG. 4 schematically illustrates averaging windows according to embodiments

With reference to FIG. 4, one efficient way to compute the total average transmission power for future times is to start by locating a lookahead window to predict a maximum of T ahead in time. In such a situation, there is no contribution from any backward window. Then the lookahead window and the backward window are moved one sample, leading to a recursive computation of the sought average power $\langle P_{tot} \rangle$ $(t_0+iT_S)$, for i=1, . . . , N.

It follows first that:

$$\langle P_{tot}(t_0 + NT_S) \rangle = \frac{NaP_{max,site}}{N} = aP_{max,site}.$$

Then, for the window positions indexed by N>i≥0, it follows that:

$$\langle P_{tot} \rangle(t_0 + iT_S) = \frac{iaP_{max,site} + P_{tot}(t_0) + \ldots + P_{tot}(t_0 + (i - (N-1))T_S))}{N}.$$

It is noted that the contribution from the backward window contains the N—i last values of momentary transmission power, for N>i≥0. This means that the sum of the contributions from the backward window can be recursively computed. For example, define the backward accumulated power as:

$$P_{backward,i} = P_{backward}(t_0 + (i - (N-1))T_S,$$
$$= P_{tot}(t_0) + \ldots + P_{tot}(t_0 + (i - (N-1))T_S)).$$

This quantity can be recursively computed as follows:

```
Start
P_backward,N = 0
i = N
While i>2
    i − −
    P_backward,i = P_backward,i+1 + P_tot(t_0 + (i − (N − 1))T_S))
End
```

Here the notation "i−−" denotes a decrease of i with one unit. The complete recursive algorithm for evaluation of future average power, together with the computation of the Boolean used to predictively trigger use of the hard limitation when performing the average power control loop, for all discrete time values up to T discrete time values ahead in time can therefore be formulated as follows:

```
Start
P_backward,N = 0
⟨P_tot⟩(t_0 + NT_S) = NaP_max,site / N = aP_max,site
MPCtrigger = false
i = N
while i>2 &~MPCtrigger
    i − −
    P_backward,i = P_backward,i+1 + P_tot(t_0 + (i − (N − 1))T_S))
    ⟨P_tot⟩(t_0 + iT_S) = iaP_max,site + P_backward,i / N
If <P_tot> (t_0 + iT_S) > εP_max,site − e
```

-continued

```
        MPCtrigger = true
    End
End
```

Here the notation "~MPCtrigger" denotes that the value of MPCtrigger is false.

The method disclosed above with reference to FIG. 4 discloses an average transmit power (or alternatively average EIRP) feedback control algorithm that guarantees that an average total transmit power threshold is never exceeded. This is a requirement for using the average EIRP rather than the maximum EIRP when determining exclusion zones around antennas of base stations.

Figure 5:
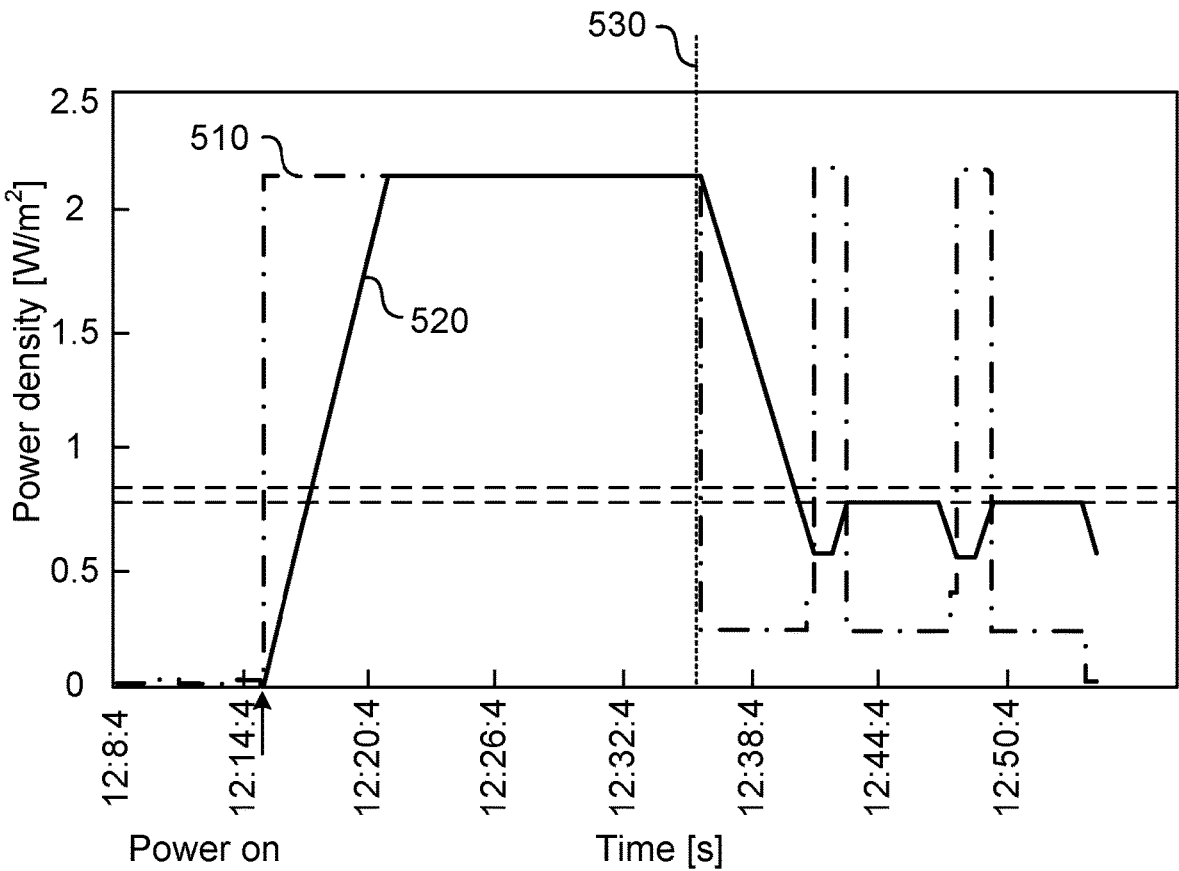
FIG. 5 shows simulation results according to embodiments.

In some scenarios the method disclosed above with reference to FIG. 4 leads to cell throughput switching in high load and in full buffer scenarios. This is shown in FIG. 5 which at 510 shows the instantaneous power density, at 520 shows the moving time-averaged power density over 6 minutes and at 530 shows the moment of activation of average power control. This can be expected and is a result of the control corresponding to pulse width modulating in high load situations. As a result, the cell throughput switches abruptly between the maximum throughput value and the minimum throughput value as set by a parameter of the controller. The end-user experience will suffer from this cell throughput switching, since either the user throughput will switch accordingly, or the number of users that may be served by the cell will switch. In the latter case, user access may become momentarily blocked.

The method disclosed above with reference to FIG. 4 is based on a combination of linear proportional derivative control, nonlinear adaptations of the proportional derivative controller to better handle the average total transmit power threshold, and an additional safety net that ensures compliance with the set average total power threshold. One potential issue with this is that in some situations, all aspects of the control problem are not simultaneously considered. Hence, optimal throughput cannot be guaranteed.

The embodiments disclosed herein therefore relate to mechanisms for controlling total average transmission power of a radio base station 140. In order to obtain such mechanisms there is provided a control device 200, a method performed by the control device 200, a computer program product comprising code, for example in the form of a computer program, that when run on a control device 200, causes the control device 200 to perform the method.

The embodiments disclosed herein in particular aim at addressing the issues noted above shown in FIG. 5 resulting from the method disclosed above with reference to FIG. 4.

Figure 6:
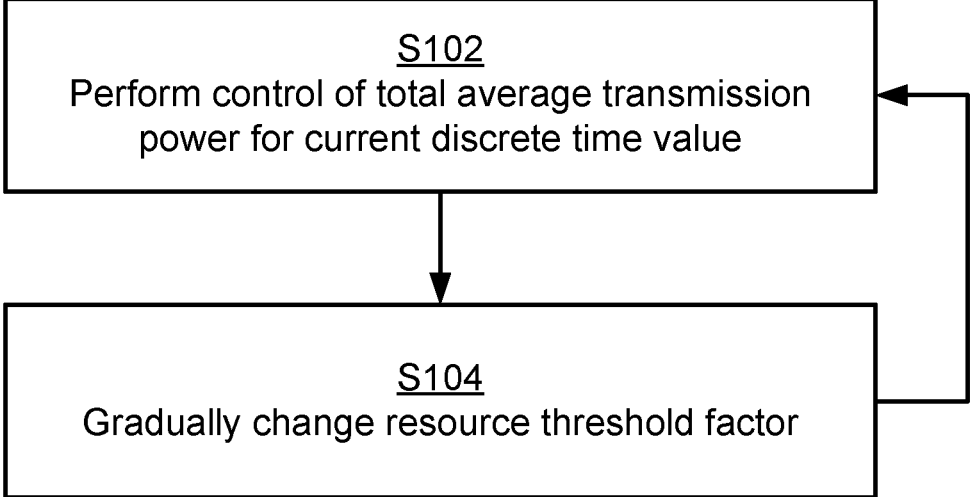
FIG. 6 is a flowchart of methods according to embodiments.

FIG. 6 is a flowchart illustrating embodiments of methods for controlling total average transmission power of a radio base station 140. The methods are performed by the control device 200. The methods are advantageously provided as computer programs 1420.

S102: The control device 200 performs, for a current discrete time value t, control of total average transmission power $\langle P_{tot} \rangle$ (t) of the radio base station 140 according to an average power control loop and subject to an upper average power threshold value that is based on a computed exclusion zone.

The total average transmission power $\langle P_{tot} \rangle$ (t) is computed over an averaging time window T of a present value of momentary transmission power and N−1 values of momentary transmission power preceding the present value of momentary transmission power.

The total average transmission power in the average power control loop is controlled to not exceed the upper average power threshold value by a resource threshold factor. The resource threshold factor limits the momentary transmission power. The total average transmission power in the average power control loop is controlled by for at least one future discrete time value less than, or equal to, t+T predicting a future value of the total average transmission power for a future assumed resource threshold factor.

S104: The control device 200 gradually changes the resource threshold factor as a function of a present state of the average power control loop. The present state at least pertains to the total average transmission power.

Advantageously, this method addresses the issues noted above shown in FIG. 5 resulting from the method disclosed above with reference to FIG. 4.

Advantageously, this method simultaneously provides a hard guarantee that the average total power threshold, set for the exclusion zone by the operator, is never exceeded and avoids throughput switching by designing the feedback controller so that upper and lower bounds on the rate of change of the resource limit are always met. This dynamic resource limit is the actuator for control of the average total transmit power.

Advantageously, this method provides a long-term throughput loss that is small, or even as small as possible, thereby providing as high performance as possible for the radio base station 140.

There could be different ways to performs control of total average transmission power $\langle P_{tot} \rangle$ (t) of the radio base station 140 in S102. In some embodiments, the total average transmission power for the at least one future discrete time value is recursively evaluated. For example, for every value $1 < i < N-1$ of the N future discrete time values, the average transmission power of index i+1 might be evaluated before the average transmission power of index i. Further, in some embodiments, the N values of average transmission power $\langle P_{tot} \rangle$ ($t_0$+i$T_S$), for a position of the averaging time window corresponding to future discrete time values i=1, . . . , N, are recursively determined from i=N down to i=1.

In some examples the N values of momentary transmission power $P_{tot}$(t) for t=$t_0$, $t_0$−$T_S$, . . . , $t_0$−(N−1)$T_S$ are within the averaging time window T for a value of momentary transmission power with time index $t_0$, and with sampling time $T_S$.

There could be different types of resource factor values. In some examples, the resource threshold factor corresponds to which fraction of total number of physical resource blocks (PRBs) to schedule for the current discrete time value.

Two embodiments relating to further details of controlling total average transmission power of a radio base station 140 as performed by the control device 200 will now be disclosed.

Depending on the embodiment, the computation of the control signal according to which the total average transmission power is controlled is performed in any of two ways. For a first embodiment, a look-up table is used, together with equations (1) and (2) as listed below. For a second embodiment, a ramping control signal is used.

A first embodiments for controlling total average transmission power of a radio base station 140 as performed by the control device 200 will now be disclosed.

In short, the first embodiment is based on configuring the control device 200 by means of dynamic programming via the so-called Hamilton-Jacobi-Bellman partial differential equation. That is, in some aspects of the first embodiment, the average power control loop is implemented using dynamic programming. This procedure yields complete hyper state feedback surfaces that are stored in look-up tables. The control signal is computed in three steps. First the hyper state is obtained in terms of the measured average total power and the present momentary resource limit. In particular, in some aspects of the first embodiment, the average power control loop is representable by a state space model composed of a set of states, where each state is defined by state variables, where the total average transmission power is one state variable and the resource threshold factor is another state variable, and where the present state is one of these states. Secondly, given the hyper state, the hyper state feedback is computed by a look-up in look-up tables. In particular, in some aspects of the first embodiment, a control signal is computed by performing a table look-up according to which an entry in a list of tabulated values of control signals is selected, where each entry is defined by indices, where each index represents a respective one of the states and a future time index value from time index t+i$T_S$ to time index t+N$T_S$==t+T, and where which entry to select is defined by the present state and present time index value of the state space model. Thirdly the control signal is computed as a function of the hyper state feedback. In particular, in some aspects of the first embodiment, the resource threshold factor is gradually changed according to a time integral of the selected entry. This procedure is then repeated regularly, typically every sampling period.

Figure 7:
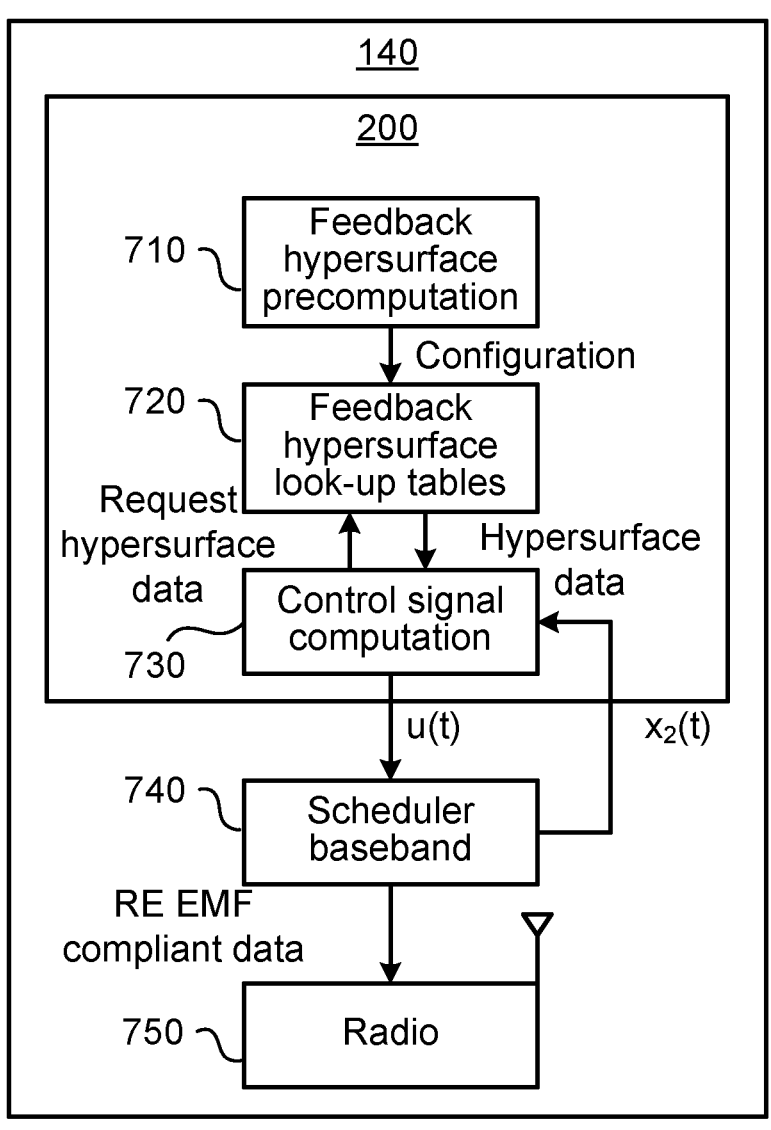
FIG. 7 schematically illustrates an architecture for a first embodiment.

FIG. 7 schematically illustrates an architecture for the first embodiment. Configuration as determined by a feedback hypersurface precomputation block 710 is provided to a feedback hypersurface look-up tables block 720. The feedback hypersurface look-up tables block stores look-up tables. A control signal computation block 730 requests hypersurface data from the feedback hypersurface look-up tables block 720 and in return receives hypersurface data from the feedback hypersurface look-up tables block 720. The control signal computation block 730, using the received hypersurface data and a state value, determines a control signal u(t) that is provided to a scheduler 740 of the radio base station 140. The scheduler 740 uses the control signal u(t) to limit the total number of PRBs to schedule and send to the radio 750 for the current discrete time value. A resulting state value x(t), as defined below, is fed back to the control signal computation block 730 to use for the next repetition.

Further details of the first embodiment will be disclosed next.

Average Power State Space Model

Aspects of a mathematical model of the dynamic system for controlling total average transmission power of a radio base station 140 will now be disclosed. In the present invention, a state space model is needed. To obtain such a model, two states can be defined, given by the average power value and the values of the dynamic actuator (limiter).

To model the dynamic bandwidth or power actuator threshold, which is selected as the second state $x_2$(t), where t is continuous time, the following is noted. The control signal u(t) that is to be designed is integrated, with the integrated result being subject to a limitation to the interval [$\gamma_{low}$, 1]. The limitation is modeled below by the Heaviside function, defined by $$H(t) = \begin{cases} 0, & t < 0 \\ 1 & t \geq 0 \end{cases}.$$

11

In addition, the smoothness needed for the numerical solution discussed below is obtained by modeling a ramped up/down limitation, over lower and upper intervals with a width of δ. This gives the state equation:

$$\dot{x}_2(t) =$$
$$\left(\left(\frac{(x_2(t)-\gamma_{low})}{\delta}\left(\bar{H}(x_2(t)-\gamma_{low}) - \bar{H}(x_2(t)-\gamma_{low}-\delta)\right) + \bar{H}(x_2(t)-\gamma_{low}-\delta) - \right.\right.$$
$$\bar{H}(x_2(t)-1+\delta) + \left(1-\frac{(x_2(t)-1+\delta)}{\delta}\right)$$
$$\left.\left(\bar{H}(x_2(t)-1+\delta) - \bar{H}(x_2(t)-1)\right)\right)u(t) \equiv f_2(x_2(t))u(t).$$

Denoting the average power by $x_1$(t) and the power of the requested traffic by $x_{in}$(t), the first state equation can be expressed as:

$$\dot{x}_1(t) =$$
$$\left(-\frac{1}{T}x_1(t) + \frac{1}{T}\left(x_{in}(t)\bar{H}(x_2(t)P_{max}-x_{in}(t)) + x_2(t)P_{max}\bar{H}(x_{in}(t)-x_2(t)P_{max})\right)\right)$$
$$\bar{H}(x_1(t)) \equiv f_1(t, x_1(t), x_2(t)),$$

where $x_{in}$(t)≥0 since it represents a power value. Further, $P_{max}$ is the maximum transmit power and T denotes the averaging time (thus defining the averaging time window). The Heaviside $\bar{H}(x_1(t))$ function ensures the positivity of $x_1$(t) for numerical reasons. In addition, $x_{in}$(t) is a deterministic disturbance, which means that the controller will need to be designed based on an assumed signal $x_{in}$(t) that represents a scenario. For example, a high load scenario will result in a more conservative controller than a low load one.

The complete state equation becomes:

$$\dot{x}(t) = \begin{pmatrix}\dot{x}_1(t) \\ \dot{x}_2(t)\end{pmatrix} = \begin{pmatrix}f_1(t, x_1(t), x_2(t)) \\ f_2(x_2(t))u(t)\end{pmatrix},$$

where x(t) denotes the state.

Hamiltonian and Optimal Return Function

To solve the control problem with the Hamilton-Jacobi-Bellman equation method, the Hamiltonian and the optimal return function are needed. The Hamiltonian H(·,·,·,·) is given by:

$$H(x(t), \lambda(t), u(t), t) =$$
$$L(t, x(t), u(t)) + B_1(x_1(t)) + B_u(u(t)) + \lambda^T(t)\begin{pmatrix}f_1(t, x_1(t), x_2(t), u(t)) \\ f_2(x_2(t))u(t)\end{pmatrix}.$$

Here λ(t) is the Lagrange multiplier vector, L(t, x(t), u(t)) is a criterion function defined below, $B_1(x_1(t))$ is a barrier function that prevents violation of the RF EMF average total power threshold, and $B_u$(u(t)) is a barrier function related to limits on the control signal treated below. In some aspects of the first embodiment, the upper average power threshold value is represented by the first barrier function $B_1(x_1(t))$, and the tabulated values are dependent on the first barrier function. The control functions might be limited by a first pre-determined rate of change and a second pre-determined rate of change. In some aspects of the first embodiment, the first pre-determined rate of change and the second pre-determined rate of change are represented by a second barrier function $B_u$(u(t)), and the tabulated values are dependent on the second barrier function.

The optimal return function, that expresses the "loss to go" from now until the terminal time $T_f$ is given by:

$$J^0(x(t), t) = \min_{u(t)}\int_t^{T_f}(L(\tau, x(\tau), u(\tau)) + B_1(x_1(\tau)) + B_u(u(\tau)))d\tau.$$

The criterion function is selected to express a compromise between control effort and throughput loss. It is noted that the cost of the throughput loss ΔR meets:

$$\Delta R(t) = \begin{cases}c(P) \geq 0, & x_{in}(t) > x_2(t)P_{max} \\ 0 & x_{in}(t) \leq x_2(t)P_{max}\end{cases}.$$

Here, c(P) is a cost depending on a power P. This motivates the following selection of L(t, x(t),u(t)):

$$L(t, x(t), u(t)) = u^2(t) + \rho c(x_{in}(t) - x_2(t)P_{max}).$$

The function c(·) is defined below. In case the rate of variation u(t) of the resource threshold $x_2$(t) is too large or small L(t, x(t), u(t)) will be large as well. However, if $x_2$(t) is small enough so that power is cut away, then there is a throughput loss. The function c(·) is selected as:

$$c(x) = \frac{1}{\varepsilon^2 P_{max}^2}x^2 + \frac{2}{\varepsilon P_{max}}x + 1 \text{ with } x = x_{in}(t) - x_2 P_{max}.$$

To describe the barrier functions, consider the general inequality constraint:

$$g(x(t), u(t)) \leq 0.$$

The idea with a barrier function is to define a function of the inequality constraint, such that this function approaches infinity when the argument approaches the constraint limit, from within the feasible set of support. Two standard ways to define barrier functions is therefore to invert the constraint (leading to a so-called inverse barrier function) or to define a logarithmic function of the constraint (leading to a so called logarithmic barrier function).

The RF EMF threshold constraint is handled by the inverse barrier function:

$$B_1(x_1(t)) = -\frac{1}{m_1}\frac{1}{(x_1(t) - \varepsilon P_{max})}.$$

Here $m_1$ is a scale factor parameter, and ε denotes the RF EMF average power threshold as a fraction between 0 and 1.

In addition to the RF EMF constraint there is a need to restrict the control signal to $[-u_0, u_1]$ or the solution to the problem may result in very large control commands, which is unwanted. The barrier function is:

$$B_u(u(t)) = -\frac{1}{m_u}(\ln{(u(t) + u_0)} + \ln{(u_1 - u(t))}).$$

Here $-u_0$ is the minimum control and $u_1$ is the maximum control.

Asymptotic Control

The reason for choice of barrier function for the control is that it allows an analytical computation of the control. The optimal control follows from the equation:

$$\frac{\partial H}{\partial u} = 0.$$

Writing out the Hamiltonian results in:

$$H(x, \lambda^T, u, t) = u^2 + \rho c(t, x_2) + \frac{1}{m_1} \frac{1}{(\varepsilon P_{max} - x_1)} -$$

$$\frac{1}{m_u}(\ln{(u + u_0)} + \ln{(u_1 - u)}) + \lambda_1 f_1(t, x_1, x_2) + \lambda_2 f_2(x_2)u.$$

The differentiation then gives the equation:

$$0 = H_u = 2u + \lambda_2 f_2(x_2) - \frac{1}{m_u}\left(\frac{1}{(u + u_0)} - \frac{1}{(u_1 - u)}\right).$$

In the asymptotic (and exact) case where $m_u \to \infty$ the equation for the control signal becomes:

$$u(u + u_0)(u_1 - u) + \frac{1}{2}f_2(x_2)\lambda_2 u(u + u_0)(u_1 - u) = 0.$$

This cubic equation in u, has the following simple analytical solution:

$$u = \begin{cases} u_1, & -\frac{1}{2}f_2(x_2)\lambda_2 \geq u_1 \\ -\frac{1}{2}f_2(x_2)\lambda_2 & -u_0 < -\frac{1}{2}f_2(x_2)\lambda_2 < u_1 \\ -u_0 & -\frac{1}{2}f_2(x_2)\lambda_2 < -u_0 \end{cases} \quad (1)$$

The first case represents maximum control and the last case represents minimum control. When the second case is solved, case 1 and case 3 may be handled by limitations in the computer code. The second case requires a numerical solution of the nonlinear Hamilton-Jacobi-Bellman equation, something that can be achieved by a number of partial differential equation solvers.

Hamilton-Jacobi-Bellman Equation

The Hamilton-Jacobi-Bellman equation is solved for the second case. The first and third cases are trivial and naturally handled as constraints to the second case. In particular, in some aspects of the first embodiment, the tabulated values are determined by solving a Hamilton-Jacobi-Bellman partial differential equation.

Recapitulating, the Hamilton-Jacobi-Bellman partial differential equation is:

$$-\frac{\partial J^0}{\partial t} = \min_u H\left(x, \frac{\partial J^0}{\partial x}, u, t\right), J(x(T_f), T_f) = 0$$

on the hypersurface $\psi(x(T_f), T_f) = 0$.

Hence, in some aspects of the first embodiment, the first barrier function and the second barrier function are (by means of the factor $J^0$) components of the Hamilton-Jacobi-Bellman partial differential equation.

The minimization with respect to the control signal means that the control signal for the second case shall be inserted back into the Hamiltonian, after which the Lagrange multipliers $\lambda_i$ shall be replaced with the partial derivatives $$J_{x_i}^0,$$

where $$J_{x_i}^0 = \frac{\partial J^0}{\partial x_i}.$$

This follows from Calculus of variations and is indicated by the argument order in the Hamiltonian, outside and inside the Hamilton-Jacobi-Bellman equation. Carrying out these operations leads to the following nonlinear partial differential equation:

$$-J_t^0 = J_{x_1}^0 f_1(t, x_1, x_2) - \frac{1}{4}f_2^2(x_2)\left(J_{x_2}^0\right)^2 + \rho c(x_{in}(t) - x_2 P_{max}) + \frac{1}{m_1}\frac{1}{(\varepsilon P_{max} - x_1)},$$

$$J^0(T_f) = 0$$

This equation has to be solved backwards in time, starting at $T_f$ using the boundary value $j^0(T_f) = 0$, then going backwards in time. Since the equation is time varying as well, this is best done by performing the following change of time variables:

$$t := T_f - t.$$

Then the resulting equation can be solved going forward in time from o.

Solution with Method of Characteristics

First order nonlinear partial differential equations in any number of variables may be solved by the "method of characteristics", devised by Hamilton. This method uses the solution to a finite number of coupled ordinary differential equations to "span" the hypersurfaces that form the solution to the partial differential equation. This characterization is performed in terms of a number of parameters, often denoted $t, s_1, \ldots, s_{n-1}$ where n denotes the number of independent variables. In the Hamilton-Jacobi-Bellman equation above there are three independent variables represented by the time and the state vector components.

The partial differential equation problem solution treated in the literature is typically formulated as $$F\left(x_1, \ldots, x_n, u, u_{x_1}, \ldots, u_{x_n}\right) = 0$$

subject to the initial conditions that represent an n−1 dimen- [5] sional surface by:

$$x_{0,i} = x_{0,i}(s_1, \ldots, s_n), \text{ and}$$

$$u_0 = u_0(s_1, \ldots, s_n).$$ [10]

Here $F(\cdot, \ldots, \cdot)$ denotes a sufficiently smooth function, $u(\cdot, \ldots, \cdot)$ is the function solved for, $x_i$, i=1, . . . , n are the independent variables, with $u_{x_i}$ denoting the corresponding [15] first order partial derivatives. Note that in the Hamilton-Jacobi-Bellman equation case, the time would be represented by $x_1$ and the first parameter. In the following, the literature is followed and the partial derivatives are therefore [20] given the notation $u_{x_i} = p_i$, i=1, . . . , n. The method of characteristics then solves the problem by integration of the following so called strip equations:

$$\frac{\partial x_i}{\partial t} = \frac{\partial F}{\partial p_i}, \quad i = 1, \ldots, n$$

$$\frac{\partial u}{\partial t} = \sum_{i=1}^{n} p_i \frac{\partial F}{\partial p_i}$$

$$\frac{\partial p_i}{\partial t} = -\frac{\partial F}{\partial x_i} - p_i \frac{\partial F}{\partial u}, \quad i = 1, \ldots, n$$

The initial conditions are given by the initial surface conditions:

$$x_{0,i} = x_{0,i}(s_1, \ldots, s_n), \text{ and}$$

$$u_0 = u_0(s_1, \ldots, s_n),$$

together with the following initial conditions:

$$p_{0,i} = p_{0,i}(0, s_1, \ldots, s_n).$$

The functions $p_{0,i}$ are determined from:

$$\frac{\partial u_0}{\partial s_i} = \sum_{i=1}^{n} p_{0,i} \frac{\partial x_{0,i}}{\partial s_i}, \quad i = 1, \ldots, n-1$$

$$F(x_{0,1}, \ldots, x_{0,n}, u_0, p_{0,1}, \ldots, p_{0,n}) = 0.$$

This completes the description of Hamilton's method of characteristics.

Going back to the notation of the Hamilton-Jacobi-Bellman equation, it is noted that the independent variables are [60] themselves propagated from the initial conditions. The hypersurfaces are thus first computed by the method of characteristics on a grid, parameterized by discretization of $t$, $s_1$ and $s_2$. The result is stored in a hypersurface lock-up table. This means that the hypersurface feedback proceeds [65] by first determining the enhanced state $(t\ x_1\ x_2)^T$. Given that, the grid indices $t$, $s_1$ and $s_2$ corresponding to the enhanced state are determined. These indices can be used to look up the stored value of $p_2(t, s_1, s_2)$. The control then follows by look up in the hyper surface look up table for $p_2 = J_{x_2}^0$ as:

$$u(t, s_1(t, x_1, x_2), s_2(t, x_1, x_2)) = \tag{2}$$

$$-\frac{1}{2} f_2(x_2(t, s_1(t, x_1, x_2), s_2(t, x_1, x_2))) J_{x_2}^0(t, s_1(t, x_1, x_2), s_2(t, x_1, x_2))$$

$$= -\frac{1}{2} f_2(x_2) J_{x_2}^0(t, s_1(t, x_1, x_2), s_2(t, x_1, x_2)).$$

Tabulated Hypersurfaces

As stated above, according to the present embodiment, feedback hypersurfaces are calculated and stored in look-up tables, from which the control signal is computed by a look-up together with equations (1) and (2). The tabulated feedback hypersurfaces are computed so that the RF EMF threshold is always respected, given the requested traffic [20] scenario. A number of additional inputs are needed for this computation, such as the averaging time (typically 6 minutes), the RF EMF threshold (typically 0.25), the maximum power of the radio base station 140, and the minimum and maximum rate of variations of the dynamic resource limiter [25] (or threshold).

As is clear from the control signal computation of (1) and (2), look-up tables for $x_1(t, s_1, s_2)$, $x_2(t, s_1, s_2)$ and $J_{x_2}(t, s_1, s_2)$ need to be stored.

A second embodiments for controlling total average trans- [30] mission power of a radio base station 140 as performed by the control device 200 will now be disclosed.

In short, the second embodiment is based on observations made by the inventors during development of the first embodiment. The inventors observed that when the bounds [35] on the rate of change of the resource limit is sufficiently tight, then the control signal tends to the upper or lower bound of the resource limit. The inventors first realized that this situation represents ramping switching average total power feedback control. The inventors secondly realized [40] that this ramping control leads to a dramatic reduction of the throughput switching amplitude. Thirdly the inventors realized and developed a simplified ramping switching average total power feedback controller, that operates without the need for stored hyper-state feedback surfaces. Accordingly, [45] in the second embodiment, the present state determines whether the total average transmission power for at least one future discrete time value less than, or equal to, t+T exceeds the upper average power threshold value or not. The state vector might then consist of the average power, the resource [50] factor and the past values in the window.

Figure 8:
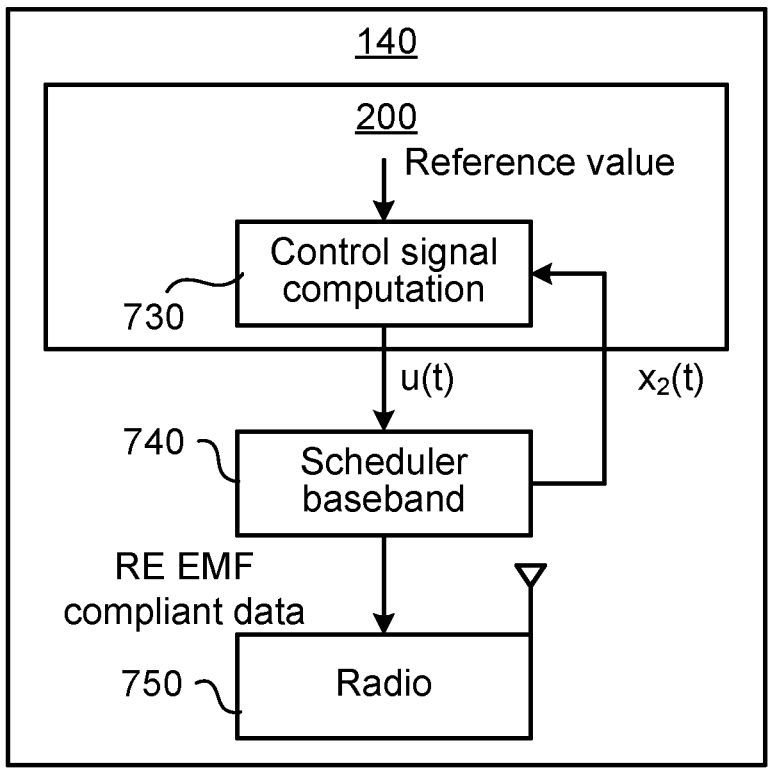
FIG. 8 schematically illustrates an architecture for a second embodiment.

FIG. 8 schematically illustrates an architecture for the second embodiment. A reference value is provided as input to a control signal computation block 730. The control signal computation block 730, based on the reference value and [55] current average power, determines a control signal u(t) that is provided to a scheduler 740 of the radio base station 140. The scheduler 740 uses the control signal u(t) to limit the total number of PRBs to schedule and send to the radio 750 for the current discrete time value. The resulting average [60] power $x_1(t)$ is fed back to the control signal computation block 730 to use for the next repetition.

Further details of the second embodiment will be disclosed next.

Model Predictive Ramping

It can be observed that a tightened restriction of the control signal (i.e., the rate of change of the resource limit) corresponds to ramping control, together with a more active control close to the terminal time. That observation leads to the second embodiment, namely to replace throughput switching by a throughput ramping.

Figure 9:
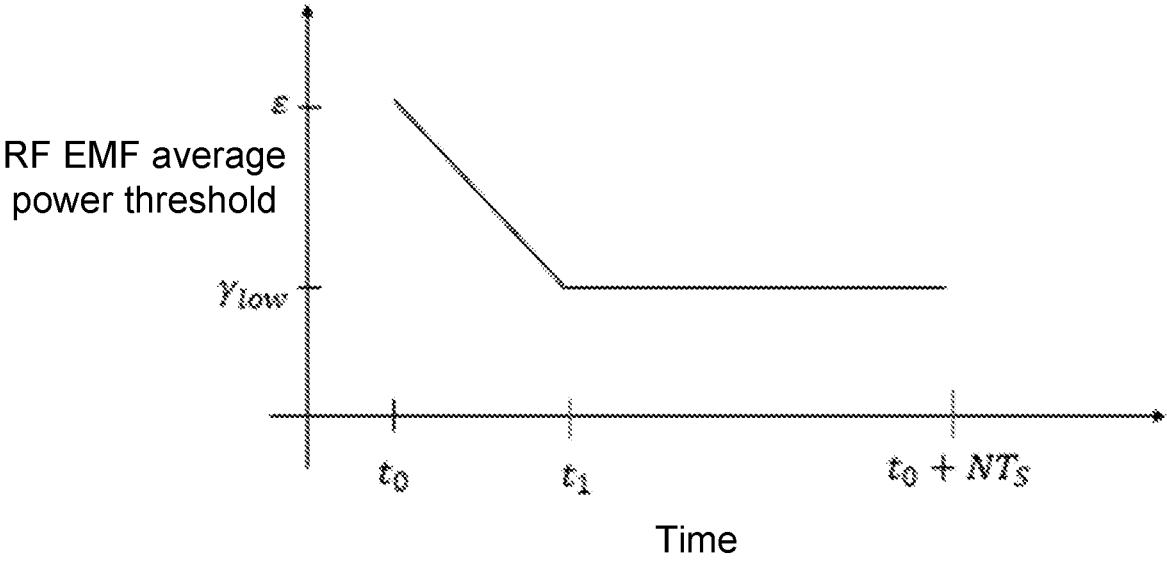
FIG. 9 schematically illustrates ramping power prediction as a function of time.

FIG. 9 schematically illustrates ramping power prediction as a function of time. In FIG. 9, during the ramping down from $\varepsilon$ to $\gamma_{low}$, a first contribution to the power predicted ahead in time will be computed from a rhombic geometry until $\gamma_{low}$ is reached and then a rectangular contribution will follow. Therefore, the predicted average power will be:

$$\langle P_{tot}(t_0 + NT_S)\rangle = \frac{1}{N}\left(\frac{(\varepsilon - \gamma_{low})(i_1 - i_0)}{2} + N\gamma_{low}\right)T_s P_{max}.$$

Here $i_0$ and $i_1$ are the indices corresponding to $t_0$ and $t_1$ of FIG. 9.

The control signal limit $-u_0$ can be related to the slope of the ramp. Since $\dot{\gamma}(t) = u(t) = -u_0$, it follows by integration that:

$$\gamma(t) = -u_0 t + c_\gamma$$

where $c_\gamma$ is a constant. A comparison with FIG. 9, shows that:

$$-u_0 = -\frac{\varepsilon - \gamma_{low}}{t_1 - t_0}.$$

The resource threshold is ramped down as long as the triggering condition is true and ramped up when the triggering condition is no longer valid. The ramping down should follow the rate of FIG. 9, but the ramping up rate may be different. The computation of the triggering condition is performed by shifting the windows backward. However, the power ahead in time is computed as the area under the curve of FIG. 9. There will therefore be two cases to consider; one for the case where $\gamma_{low}$ is reached and another for the case where ramping down is still under way. In the first case it holds that:

$$\langle P_{tot}\rangle(t_0 + iT_S) = $$

$$\frac{\left(\frac{(\varepsilon - \gamma_{low})(i_1 - i_0)}{2} + i\gamma_{low}\right)T_s P_{max} + P_{tot}(t_0) + \ldots + P_{tot}(t_0 + (i-(N-1))T_S)}{N}.$$

In the second case it holds that:

$$\langle P_{tot}\rangle(t_0 + iT_S) = $$

$$\frac{\left(\frac{(\varepsilon - \gamma_{low})(i_1 - i_0)}{2} + (i_1 - i_0)\gamma_{low}\right)T_s P_{max} + P_{tot}(t_0) + \ldots + P_{tot}(t_0 + (i-(N-1))T_S)}{N}.$$

The recursive computation of the sum of the stored powers remains the same. Hence, according to the second embodiment, the control algorithm can be expressed as ramping down the resource limitation in case at least one predicted average total power in a future time window is above an average total power threshold and ramping up the resource limitation in case all predicted average total powers in a future time window is below an average total power threshold. That is, when the total average transmission power for at least one future discrete time value less than, or equal to, t+T exceeds the upper average power threshold value, the resource threshold factor is gradually decreased. Further, when the total average transmission power for no future discrete time values less than, or equal to, t+T exceeds the upper average power threshold value, the resource threshold factor is gradually increased.

In some aspects, the ramping down is performed with a first pre-determined rate of change. That is, the resource threshold factor might be gradually decreased according to a first pre-determined rate of change. In some examples, the first pre-determined rate of change equals a minimum control factor $-u_0$. In some aspects, the ramping up is performed with a second pre-determined rate of change. That is, the resource threshold factor might be gradually increased according to a second pre-determined rate of change. In some examples, the second pre-determined rate of change equals a maximum control factor $u_1$.

Figure 10:
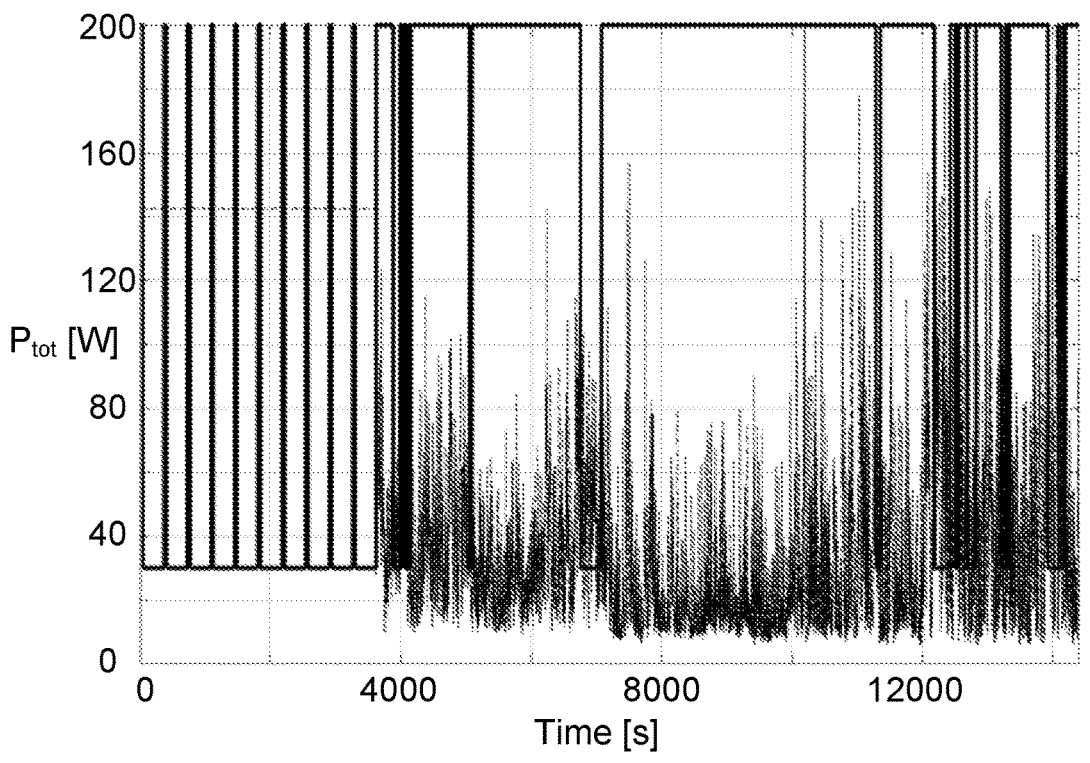
FIG. 10 shows simulation results according to embodiments.
Figure 11:
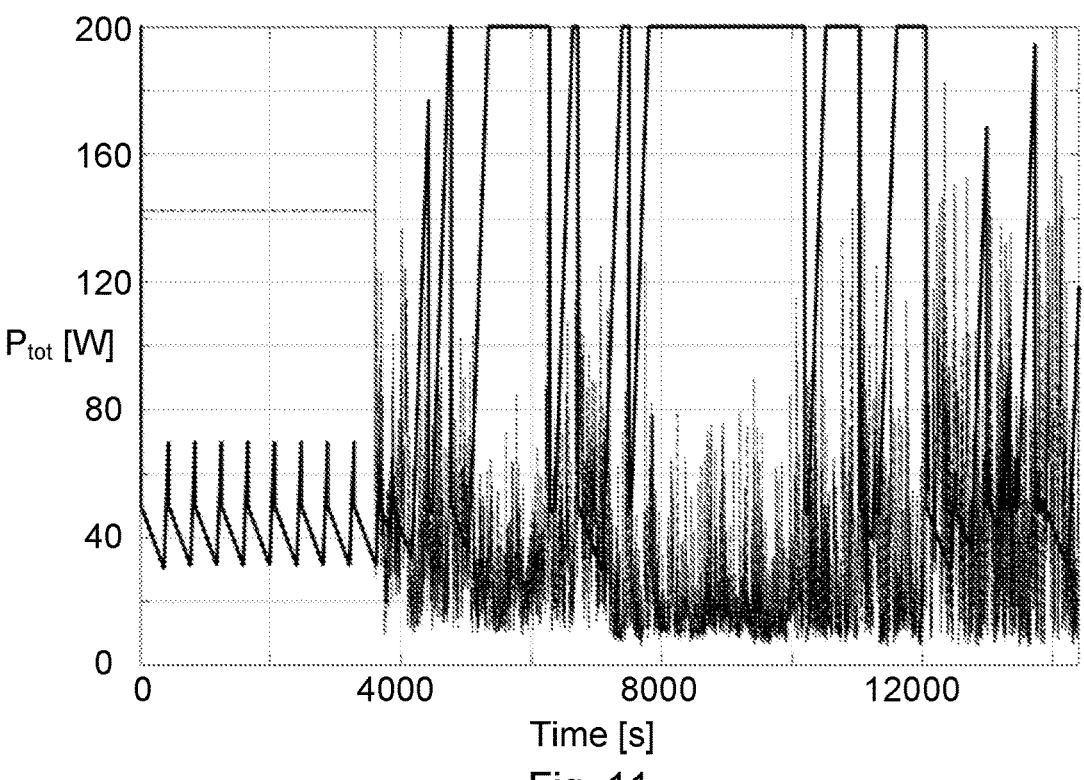
FIG. 11 shows simulation results according to embodiments.

Simulation results will be disclosed next with reference to FIG. 10 and FIG. 11. In both figures, the clipping level is shown with a solid line and the momentary power is shown with a dash-dotted line. FIG. 10 shows the performance of the method disclosed above with reference to FIG. 4 in a high load scenario. FIG. 11 shows the performance of the method as disclosed with reference to FIG. 5 in the same high load scenario. It can be seen in the left part of these figures that the switching between 30 W and 200 W as occurring in FIG. 10 is in FIG. 11 replaced by a ramping with much less power variation, thereby mitigating throughput switching.

Figure 12:
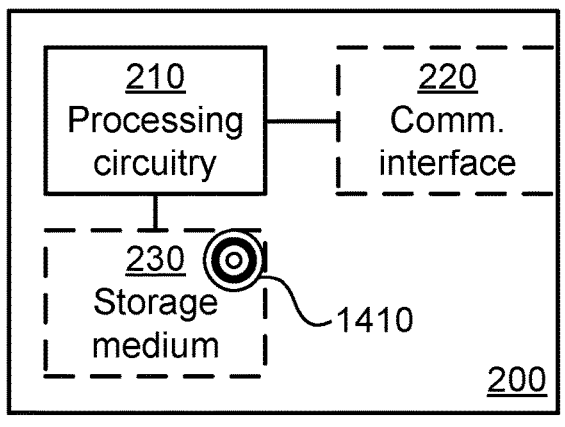
FIG. 12 is a schematic diagram showing functional units of a control device according to an embodiment.

FIG. 12 schematically illustrates, in terms of a number of functional units, the components of a control device 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1410 (as in FIG. 14), e.g. in the form of a storage medium 230. The processing circuitry 210 may further be provided as at least one application specific integrated circuit (ASIC), or field programmable gate array (FPGA).

Particularly, the processing circuitry 210 is configured to cause the control device 200 to perform a set of operations, or steps, as disclosed above. For example, the storage medium 230 may store the set of operations, and the processing circuitry 210 may be configured to retrieve the set of operations from the storage medium 230 to cause the control device 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The control device 200 may further comprise a communications interface 220 at least configured for communications with other entities, nodes, functions, and devices, such as the radio base station 140. As such the communications interface 220 may comprise one or more transmitters and receivers, comprising analogue and digital components. The processing circuitry 210 controls the general operation of the control device 200 e.g. by sending data and control signals to the communications interface 220 and the storage medium 230, by receiving data and reports from the communications interface 220, and by retrieving data and instructions from the storage medium 230. Other components, as well as the related functionality, of the control device 200 are omitted in order not to obscure the concepts presented herein.

Figure 13:
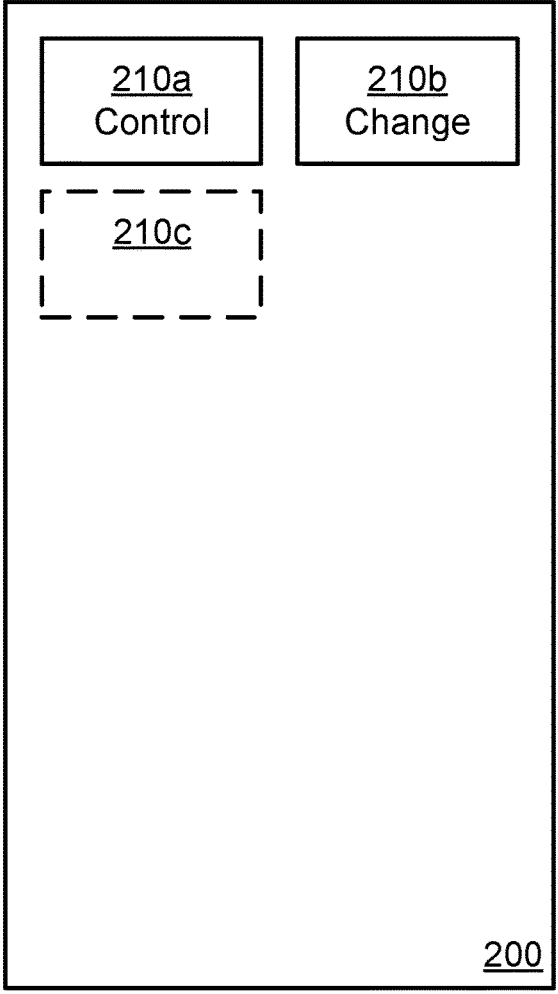
FIG. 13 is a schematic diagram showing functional modules of a control device according to an embodiment.

FIG. 13 schematically illustrates, in terms of a number of functional modules, the components of a control device 200 according to an embodiment. The control device 200 of FIG. 13 comprises a number of functional modules; a control module 210a configured to perform step S102, and a change module 210b configured to perform step S104. The control device 200 of FIG. 13 may further comprise a number of optional functional modules, as represented by functional module 210C. In general terms, each functional module 210a:210c may in one embodiment be implemented only in hardware and in another embodiment with the help of software, i.e., the latter embodiment having computer program instructions stored on the storage medium 230 which when run on the processing circuitry makes the control device 200 perform the corresponding steps mentioned above in conjunction with FIG. 13. It should also be mentioned that even though the modules correspond to parts of a computer program, they do not need to be separate modules therein, but the way in which they are implemented in software is dependent on the programming language used. Preferably, one or more or all functional modules 210a:210c may be implemented by the processing circuitry 210, possibly in cooperation with the communications interface 220 and/or the storage medium 230. The processing circuitry 210 may thus be configured to from the storage medium 230 fetch instructions as provided by a functional module 210a:210c and to execute these instructions, thereby performing any steps as disclosed herein.

The control device 200 may be provided as a standalone device or as a part of at least one further device. For example, the control device 200 may be provided in a node of the radio access network or in a node of the core network. Alternatively, functionality of the control device 200 may be distributed between at least two devices, or nodes. These at least two nodes, or devices, may either be part of the same network part (such as the radio access network or the core network) or may be spread between at least two such network parts. In general terms, instructions that are required to be performed in real time may be performed in a device, or node, operatively closer to the cell than instructions that are not required to be performed in real time.

Thus, a first portion of the instructions performed by the control device 200 may be executed in a first device, and a second portion of the of the instructions performed by the control device 200 may be executed in a second device; the herein disclosed embodiments are not limited to any particular number of devices on which the instructions performed by the control device 200 may be executed. Hence, the methods according to the herein disclosed embodiments are suitable to be performed by a control device 200 residing in a cloud computational environment. Therefore, although a single processing circuitry 210 is illustrated in FIG. 12 the processing circuitry 210 may be distributed among a plurality of devices, or nodes. The same applies to the functional modules 210a:210c of FIG. 13 and the computer program 1420 of FIG. 14.

Figure 14:
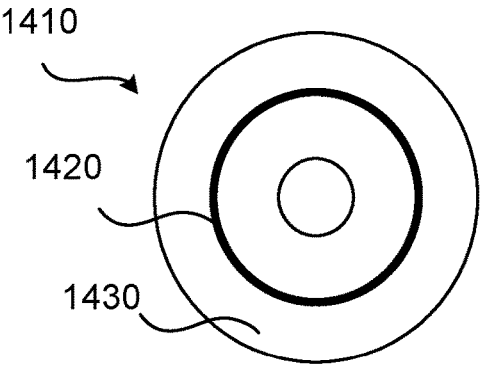
FIG. 14 shows one example of a computer program product comprising computer readable storage medium according to an embodiment.

FIG. 14 shows one example of a computer program product 1410 comprising computer readable storage medium 1430. On this computer readable storage medium

1430, a computer program 1420 can be stored, which computer program 1420 can cause the processing circuitry 210 and thereto operatively coupled entities and devices, such as the communications interface 220 and the storage medium 230, to execute methods according to embodiments described herein. The computer program 1420 and/or computer program product 1410 may thus provide means for performing any steps as herein disclosed.

In the example of FIG. 14, the computer program product 1410 is illustrated as an optical disc, such as a CD (compact disc) or a DVD (digital versatile disc) or a Blu-Ray disc. The computer program product 1410 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1420 is here schematically shown as a track on the depicted optical disk, the computer program 1420 can be stored in any way which is suitable for the computer program product 1410.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for controlling total average transmission power of a radio base station, the method being performed by a control device, the method comprising:

performing, for a current discrete time value t, control of total average transmission power of the radio base station according to an average power control loop and subject to an upper average power threshold value that is based on a computed exclusion zone, wherein the total average transmission power is computed over an averaging time window T of a present value of momentary transmission power and N−1 values of momentary transmission power preceding the present value of momentary transmission power, wherein the total average transmission power in the average power control loop is controlled to not exceed the upper average power threshold value by a resource threshold factor that limits the momentary transmission power and by for at least one future discrete time value less than, or equal to, t+T predicting a future value of the total average transmission power for a future assumed resource threshold factor; and gradually changing the resource threshold factor as a function of a present state of the average power control loop, wherein the present state at least pertains to the total average transmission power.

2. The method according to claim 1, wherein the present state determines whether the total average transmission power for at least one future discrete time value less than, or equal to, t+T exceeds the upper average power threshold value or not.

3. The method according to claim 1, wherein when the total average transmission power for at least one future discrete time value less than, or equal to, t+T exceeds the upper average power threshold value, the resource threshold factor is gradually decreased.

4. The method according to claim 3, wherein the resource threshold factor is gradually decreased according to a first pre-determined rate of change.

5. The method according to claim 4, wherein the first pre-determined rate of change equals a minimum control factor $-u_0$.

6. The method according to claim 3, wherein when the total average transmission power for no future discrete time values less than, or equal to, $t+T$ exceeds the upper average power threshold value, the resource threshold factor is gradually increased.

7. The method according to claim 6, wherein the resource threshold factor is gradually increased according to a second pre-determined rate of change.

8. The method according to claim 7, wherein the second pre-determined rate of change equals a maximum control factor $u_1$.

9. The method according to claim 1, wherein the average power control loop is representable by a state space model composed of a set of states, each state being defined by state variables, where the total average transmission power is one state variable and the resource threshold factor is another state variable, and where the present state is one of these states.

10. The method according to claim 9, wherein a control signal is computed by performing a table look-up according to which an entry in a list of tabulated values of control signals is selected, wherein each entry is defined by indices, where each index represents a respective one of the states and a future time index value from time index $t+iT_s$ to time index $t+NT_s=t+T$, and wherein which entry to select is defined by the present state and present time index value of the state space model.

11. The method according to claim 10, wherein the resource threshold factor is gradually changed according to a time integral of the selected entry.

12. The method according to claim 10, wherein the upper average power threshold value is represented by a first barrier function $B_1(x_1(t))$, and wherein the tabulated values are dependent on the first barrier function.

13. The method according to claim 10, wherein control functions are limited by a first pre-determined rate of change and a second pre-determined rate of change.

14. The method according to claim 13, wherein the first pre-determined rate of change and the second pre-determined rate of change are represented by a second barrier function $B_u(u(t))$, and wherein the tabulated values are dependent on the second barrier function.

15. The method according to claim 10, wherein the tabulated values are determined by solving a Hamilton-Jacobi-Bellman partial differential equation.

16. The method according to claim 12, wherein control functions are limited by a first pre-determined rate of change and a second pre-determined rate of change, wherein the first pre-determined rate of change and the second pre-determined rate of change are represented by a second barrier function $B_u(u(t))$, wherein the tabulated values are dependent on the second barrier function, and wherein the first barrier function and the second barrier function are components of a Hamilton-Jacobi-Bellman partial differential equation.

17. The method according to claim 1, wherein the average power control loop is implemented using dynamic programming.

18. The method according to claim 1, wherein the total average transmission power for the at least one future discrete time value is recursively evaluated.

19. A control device for controlling total average transmission power of a radio base station, the control device comprising:

processing circuitry, the processing circuitry being configured to cause the control device to:

perform, for a current discrete time value t, control of total average transmission power of the radio base station according to an average power control loop and subject to an upper average power threshold value that is based on a computed exclusion zone, wherein the total average transmission power is computed over an averaging time window T of a present value of momentary transmission power and $N-1$ values of momentary transmission power preceding the present value of momentary transmission power, wherein the total average transmission power in the average power control loop is controlled to not exceed the upper average power threshold value by a resource threshold factor that limits the momentary transmission power and by for at least one future discrete time value less than, or equal to, $t+T$ predicting a future value of the total average transmission power for a future assumed resource threshold factor; and gradually change the resource threshold factor as a function of a present state of the average power control loop, wherein the present state at least pertains to the total average transmission power.

20. A non-transitory computer-readable storage medium comprising instructions which, when executed by a computer, cause a control device to control average transmission power of a radio base station by performing operations comprising:

performing, for a current discrete time value t, control of total average transmission power of the radio base station according to an average power control loop and subject to an upper average power threshold value that is based on a computed exclusion zone, wherein the total average transmission power is computed over an averaging time window T of a present value of momentary transmission power and $N-1$ values of momentary transmission power preceding the present value of momentary transmission power, wherein the total average transmission power in the average power control loop is controlled to not exceed the upper average power threshold value by a resource threshold factor that limits the momentary transmission power and by for at least one future discrete time value less than, or equal to, $t+T$ predicting a future value of the total average transmission power for a future assumed resource threshold factor; and gradually changing the resource threshold factor as a function of a present state of the average power control loop, wherein the present state at least pertains to the total average transmission power.

* * * * *